(No Model.)

D. W. SMITH & J. C. BITTENBENDER.
GRAIN DRILL.

No. 371,388. Patented Oct. 11, 1887.

Witnesses.
John C. Perkins
Henry G. M. Howard

Inventors.
Dwight W. Smith
Jacob C. Bittenbender
By Lucius C. West
Atty.

UNITED STATES PATENT OFFICE.

DWIGHT W. SMITH AND JACOB C. BITTENBENDER, OF CONSTANTINE, MICHIGAN; SAID BITTENBENDER ASSIGNOR OF ONE-HALF OF HIS RIGHT TO SAID SMITH.

GRAIN-DRILL.

SPECIFICATION forming part of Letters Patent No. 371,388, dated October 11, 1887.

Application filed December 14, 1886. Serial No. 221,539. (No model.)

*To all whom it may concern:*

Be it known that we, DWIGHT W. SMITH and JACOB C. BITTENBENDER, citizens of the United States, residing at Constantine, county of St. Joseph, State of Michigan, have invented a new and useful Grain-Drill, of which the following is a specification.

The objects of this invention consist in certain constructions and combinations of parts, substantially as below described and claimed.

Figure 1:
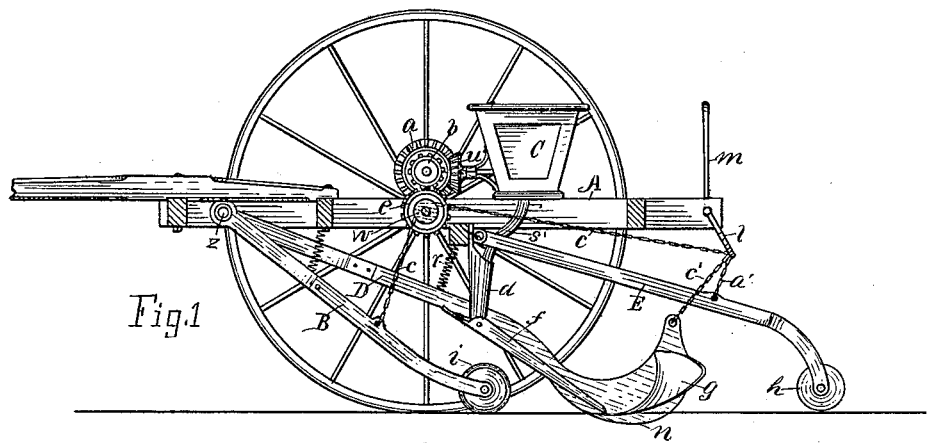
Figures 2, 5:
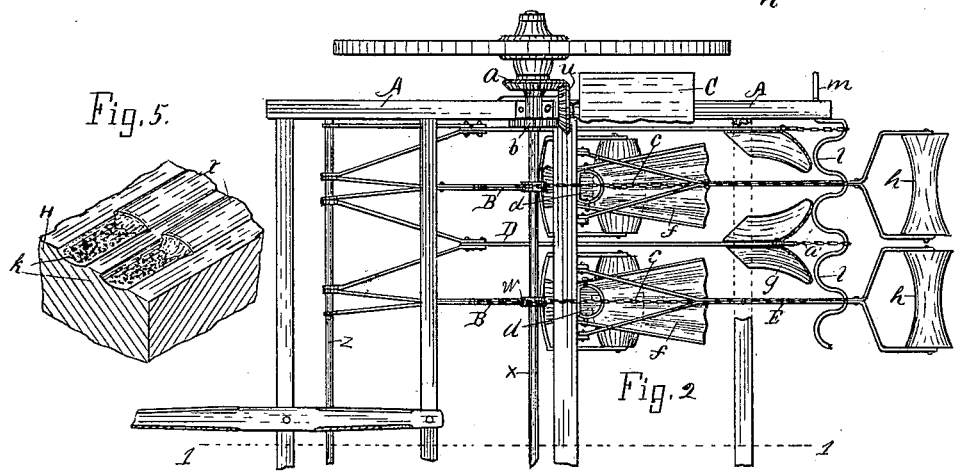
Figure 3:
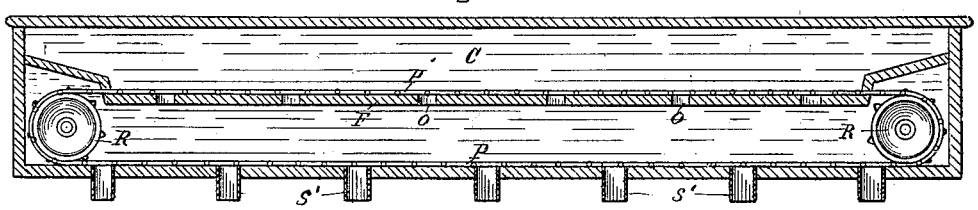
Figure 4:
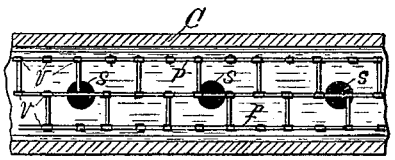

In the drawings forming a part of this specification, Figure 1 is side elevation, parts being in section, on line 1 1 in Fig. 2. Fig. 2 is a plan of a part of the complete machine, the shares, rollers, &c., showing the style employed throughout the width of the machine. Fig. 3 is an enlarged longitudinal section of the seed-box through its vertical center; Fig. 4, a broken plan of the feed-belt, looking down upon the lower floor of the seed-box; and Fig. 5 is a section of ground in perspective, showing the plan of seeding.

Referring to the lettered parts, A is the wheel-frame, $x$ the axle, and $z$ a forward bar to which the share-bars D are pivoted, all substantially as heretofore in different machines.

The design of the invention is, first, to provide the machine-frame with a forward roller, convexed to form the furrows $k$ in the soil H, Fig. 5. These rollers are shown at $i$ mounted in the rear end of bars B. These bars are pivoted at the forward end to the rod $z$.

Second, to distribute the grain which falls from the seed-box C down through grain-tube $s'$ $d$, well scattered in the furrows $k$. This we effect by means of the distributers $f$, pivoted to the bottom of the grain-tube and flaring at the rear end, which end drags in the furrow. These distributers may be corrugated, Fig. 2, or not, as desired.

Third, to follow the grain-distributers with shares or coverers on each side of the furrow. Any suitable shares may be employed. Those shown at $g$ consist of a mold-board on both sides of a plate, $n$, attached to the rear end of beams or bars D. The lower edge of the plate $n$ extends below the mold-board and enters the undisturbed soil to guide the shares and prevent them from lateral displacement. If preferred, the shares may be attached to the lower end of standards pendent below the frame A. The shares throw the earth from both ways into the furrow, leaving it ribbed.

Fourth, to follow the shares with concave rollers, which roll the furrows, leaving them smooth and convexed, as at $t$, Fig. 5. These rollers are shown at $h$ mounted in the rear end of bars E, pivoted or hinged at their forward end to a transverse beam of the frame, Figs. 1 and 2.

The grain may be sown directly on the unfurrowed ground without the use of the forward rollers, $i$, and the ribbed furrows may be left unrolled, thus dispensing with the rear rollers, $h$. It will appear obvious that grain sown in raised or ribbed furrows in this manner will come up quicker and more uniformly and will be less liable to freeze and drown out than if sown by the ordinary drill and left in trenches which are lower than the soil between the rows. The water settles in the trenches between the rows, and the trench which the edge $n$ of the share forms assists to this end. The several bars may rise against a spring-resistance, or be otherwise weighted to cause the rollers and shares to properly act upon the soil. The idea is illustrated at $r$, Fig. 1. These springs, or other suitable springs in lieu thereof, may be adjustable in any desired manner to increase their resistance.

At $l$ is shown a zigzag bar, revoluble in the rear end of the frame, one end terminating in a crank, $m$. Chains $c$ $c'$ $a'$ are attached to the share-bars and roller-bars and to the bows of the bar $l$. (Chains $c$ pass over pulleys $w$.) By turning said lifting-bar $l$ the shares and rollers are raised at the same time, and the forward roller contacts with the pivoted grain-distributer and swings it up, all under one operation, when going to the field or turning around at the end of the rows.

The grain-box has a series of holes, $s$, through the floor, with which holes the tubes $s'$ attach. F is a longitudinal partition or upper floor, having holes $o$ alternating with the holes $s$, Fig. 3. The feed consists in an endless chain belt composed of two rows of open links, P, all jointedly connected and jointed at the sides $v$ $v$, Fig. 4, the links of one row lapping halfway with the links of the other row. The upper part of the grain-belt P traverses the upper side of the floor F, and beneath the grain in the box C, and the lower part traverses the upper surface of the lower floor. The belt is carried by the pulleys R, one of which pulleys is driven from the axle $x$ by gears $b$ $a$ $e$ $u$. In Fig. 2 only the end of the seed-box is shown where the shaft of the gear $u$ is lolocated; but this particular gear has nothing to do with this invention and is subject to change.

In the operation the upper chain or grain belt distributes the grain, and what falls through the holes $o$ is raked over the holes $s$ by the lower chain. Then it falls through the grain-tube $s'$ $d$.

It will be seen by referring to Fig. 4 that by lapping the links of the belt P the end bars of the links do not reach only part way over the holes $s$. Thus the bars alternately pass over opposite sides of the holes, and thereby secure a more desirable agitation of the grain over the holes. So far as the parts of the construction which act upon the soil are concerned, any other suitable feed may be employed.

Having thus described our invention, what we claim is—

1. The combination, with the forward and rear rollers and the shares, all attached to the frame by the bars hinged thereto, as described, of the grain-tubes and the shovel-form fluted grain-distributers hinged to the lower end of the grain-tubes, so as to drag in the furrow and play vertically in conformity with the surface of the furrows, substantially as set forth.

2. The combination of the frame, the rollers and their bars, the shares and share-bars, the grain-tubes, and the grain-distributers hinged to the lower end of the tubes, a crank-shaft, and chains for raising said parts, all being adapted to be raised in unison, substantially as set forth.

3. The combination of the forward and rear rollers and their bars, shares and share-bars, grain-tubes and the pivotally-connecting grain-distributers, the forward rollers being arranged to contact with the distributers when raised to tilt them upward, and means for raising said parts in unison, substantially as set forth.

4. The combination of a seed-box having two separated perforated floors and an endless belt composed of open links adapted to traverse the upper surface of both floors, substantially as set forth.

5. The combination of the seed-box having the perforated floors and the endless belt composed of rows of jointedly-joined lapping links, substantially as set forth.

In testimony of the foregoing we have hereunto subscribed our names in presence of two witnesses.

DWIGHT W. SMITH.
JACOB C. BITTENBENDER.

Witnesses:
JOSEPH E. KELLOGG,
JOHN H. CHASE.